Jan. 25, 1955 M. E. CHANDLER ET AL 2,700,275
FUEL CONTROL APPARATUS FOR TURBOJET ENGINES
Filed Dec. 21, 1948 2 Sheets-Sheet 1
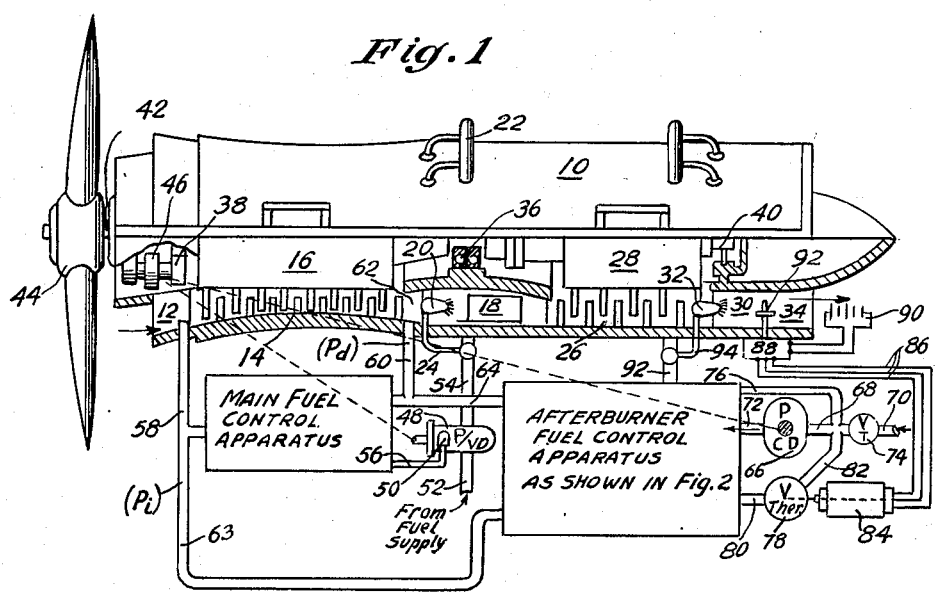
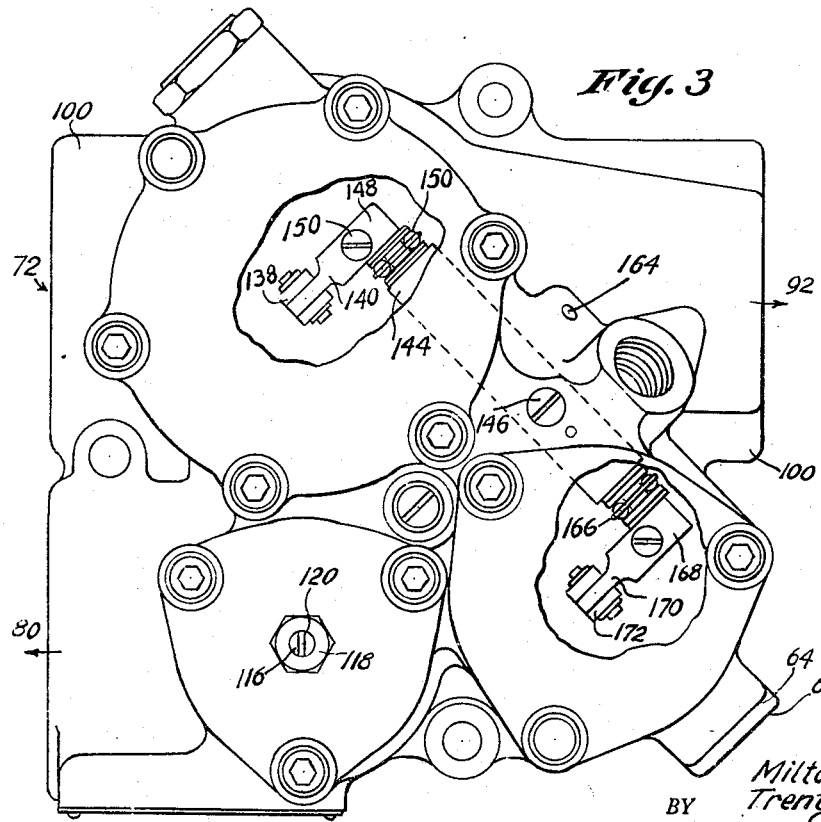
INVENTOR.
Milton E. Chandler
Trent H. Holmes
BY
ATTORNEY

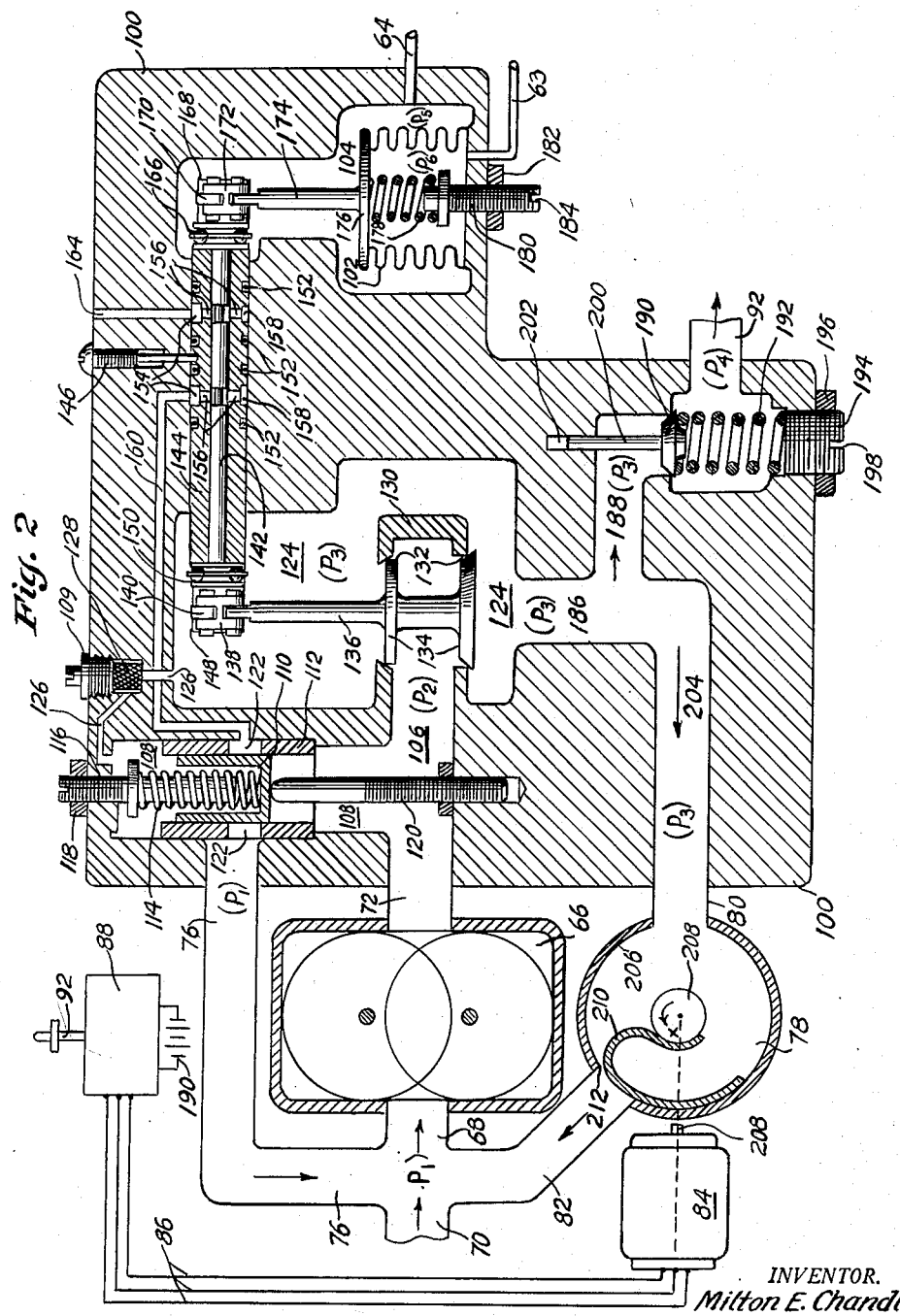

United States Patent Office 2,700,275
Patented Jan. 25, 1955

2,700,275

FUEL CONTROL APPARATUS FOR TURBOJET ENGINES

Milton E. Chandler, New Britain, and Trent H. Holmes, Middletown, Conn., assignors to Niles-Bement-Pond Company, West Hartford, Conn., a corporation of New Jersey Application December 21, 1948, Serial No. 66,515

22 Claims. (Cl. 60—35.6)

This invention pertains to fuel control apparatus for internal combustion engines suitable for propeller-propulsion, jet-propulsion, or combined propeller-and-jet (propjet) propulsion of aircraft, and more particularly has reference to fuel control apparatus for such engines which comprise a gas turbine, for supplying part of the propulsion power of the engine, and a supplementary combustion chamber, on the discharge side of said turbine, for reheating the exhaust gases from said turbine to increase the jet reaction power of the engine when maximum power output is desired.

Engines of this type usually include an air inlet, an air compressor, one or more main combustion chambers having a series of burner nozzles through which the main fuel supply is fed, a gas turbine, a supplementary combustion chamber also having a series of burner nozzles through which the supplementary fuel supply is fed, and a tail pipe for discharging the combustion gases to the atmosphere in the form of a jet. Associated with the engine are a main fuel supply system, including a fuel pump and control apparatus, for delivering fuel to the main combustion chambers, and a supplementary fuel supply system, including a fuel pump and control apparatus, for delivering fuel to the afterburners in the supplementary combustion chamber. This invention is particularly concerned with the afterburner fuel control apparatus which controls the supplementary (jet) power of the engine as a function of mass air flow through said engine and engine (tail pipe) temperature.

The maximum power output of an engine of the type referred to can be greatly increased, for limited periods of operation, by the use of a supplementary combustion chamber to reheat the exhaust gases from the turbine and thus augment the propulsive power of the jet of exhaust gases discharged into the atmosphere. This increased power output is particularly beneficial when the aircraft is taking off from the ground, when climbing at a rapid rate and when maximum speed is required in maneuvering. However, when a supplementary combustion chamber is employed, it is essential that the reheating of the turbine exhaust gases be regulated in accordance with the air flow through the engine, and that the maximum permissible temperature in the tail pipe is not exceeded.

Objects of this invention are:

(1) To provide an improved afterburner fuel control apparatus, associated with the main fuel control apparatus of the engine, which will control the delivery of fuel to the afterburners in accordance with a predetermined relationship with the mass air flow through the engine.

(2) To provide an improved fuel control apparatus having novel means for closely regulating the afterburner fuel flow in accordance with the pressure differential across the compressor of the engine.

(3) To provide an improved apparatus which will control the delivery of fuel to the afterburners in accordance with a predetermined relationship with the temperature of the exhaust gases in the engine tail pipe.

(4) To provide an improved afterburner fuel control apparatus having novel means for preventing leakage of fuel therefrom even when subjected to high fuel pressures.

(5) To provide an improved afterburner fuel control apparatus with novel means to prevent sticking of the main fuel flow control valve.

With these and other objects in view which may be incident to our improvements, our invention consists in the combination and arrangement of elements hereinafter described and illustrated in the accompanying drawings, in which:

Figure 1 shows, somewhat diagrammatically, a turbojet aircraft engine with its associated main fuel supply system and afterburner fuel supply system, including our improved control apparatus, together with the principal connections therebetween.

Figure 2 shows, also somewhat diagrammatically, an afterburner fuel control apparatus embodying the principles of our invention.

Figure 3 shows a top plan view, partly broken away, of our improved control apparatus, as actually constructed.

Referring to Figure 1, there are shown the principal elements of the engine above referred to, comprising: a supporting casing 10, an air inlet 12, a multi-stage air compressor 14 with its rotor shaft 16, one of a number of main combustion chambers 18, one of a corresponding number of main fuel burner nozzles 20, connected to a generally circular fuel manifold 22 by means of a conduit 24, a multi-stage turbine 26 with its rotor shaft 28 connected to compressor rotor shaft 16; an afterburner combustion chamber 30 having therein a number of afterburner fuel nozzles 32, a tail pipe 34 for discharging combustion exhaust gases to the atmosphere; a center bearing 36 and end bearings 38 and 40 supported by casing 10, a propeller shaft 42 to which is fixed a propeller 44, and a gear train 46 connecting shafts 16 and 42 for rotating propeller 44 at a speed proportional to engine speed and for operating the fuel pumps and other accessories. The construction of an engine used solely for jet propulsion is similar to that of Figure 1, except for the omission of the propeller and propeller shaft and corresponding modification of the gear train. Also in a jet engine, since the power developed by the turbine is used only for operating the compressor and engine accessories, a single-stage rather than multi-stage turbine construction is generally employed.

The main fuel supply system to the engine includes a variable delivery fuel pump 48, driven from engine gear train 46, and having a fuel delivery varying means diagrammatically shown at 50. Pump 48 receives fuel under pressure through inlet conduit 52 from a source of fuel supply (not shown), and delivers fuel, through outlet conduit 54 and connecting conduit 24, to burner nozzles 20 in main combustion chamber 18. Fuel delivery varying means 50 is responsive to a variable control oil pressure in a conduit 56 which is regulated by the main fuel control apparatus, as disclosed in the copending application of Leighton Lee, II, for "Fuel and Speed Control Apparatus for Turbojet Engines," Serial No. 746,975, filed May 9, 1947, now Patent No. 2,675,674, and assigned to the same assignee to which this application is assigned. The main fuel control apparatus is connected through a conduit 58 with air inlet 12, and through a conduit 60 with a chamber 62 at the discharge outlet of compressor 14, for the purpose described in the copending application cited.

The afterburner control apparatus, shown in detail in Figure 2, is also connected to air inlet 12 by a conduit 63 communicating with conduit 58, and to the same source of compressor discharge pressure ($p_a$) by a conduit 64 communicating with conduit 60. The pressure differential between air inlet pressure ($p_i$) and compressor discharge pressure ($p_a$) is a measure of the mass air flow through the engine. The value of this pressure differential ($p_a-p_i$) increases as the engine speed increases, as the speed of flight increases, and as the altitude of flight and/or atmospheric temperature decreases, and is also a function of the compressor characteristics.

Associated with the afterburner fuel control apparatus is a constant delivery fuel pump 66 which receives fuel under pressure from a source of fuel supply (not shown) through connecting conduits 68 and 70 and delivers fuel to the afterburner control apparatus through a connecting conduit 72. A cut-off throttle valve 74 in conduit 70 enables the pilot to shut off the flow of fuel to the afterburner control apparatus when reheating of the turbine exhaust gases is not desired. A conduit 76 connects the afterburner control apparatus with conduit 68 on the inlet side of pump 66 for the purpose of shunting excess fuel around pump 66, as hereinafter described. A thermostatic regulating valve 78 is connected by a conduit 80 with the afterburner control apparatus, and by a conduit 82 with conduit 68 on the inlet side of pump 66, as hereinafter further described.

An electric motor 84, which operates valve 78, is connected by wires 86 with an amplifier 88 which receives an electric current from a battery 90 or other source of electricity. Amplifier 88 is responsive to a thermocouple, or similar thermo-responsive element 92, so located in tail pipe 34 as to be exposed to the exhaust gases therein. The afterburner control apparatus delivers fuel through connecting conduits 92 and 94 to afterburner nozzles 32 in supplementary combustion chamber 30.

Referring now to Figure 2, there is shown, somewhat diagrammatically, an afterburner fuel control apparatus comprising a casing 100 which is shown as of continuous cross-section, but is actually for purposes of manufacture made up in an equivalent form from a plurality of separate parts. Casing 100 is connected by conduits 63 and 58 with air inlet 12 for supplying air at inlet pressure ($p_1$) to the interior of a bellows 102, located in a chamber 104 which is supplied with air at compressor discharge pressure ($p_d$) by conduits 64 and 60. A fuel inlet chamber 106 in casing 100 receives fuel through conduit 72 from pump 66 which in turn is supplied with fuel under a relatively low, substantially constant pressure ($p_1$), through conduits 68 and 70 from a fuel supply source (not shown).

Communicating with chamber 106 is a vertically disposed chamber 108 in which is located a fuel metering head valve 110, slidably mounted in a sleeve 112 seated in the side walls of chamber 108. Valve 110 is biased in a downward direction by a spring 114 whose compression is adjustable by a screw-threaded stem 116 passing through the top wall of casing 100 and is locked in position by a lock nut 118. The upper end of stem 116 has a slot for the reception of a screw-driver by which stem 116 is rotated when lock nut 118 is loosened. (See also Figure 3.) An adjustable stop 120 in chamber 108 limits the travel of valve 110 in a downward direction. Sleeve 112 is provided with a plurality of ports 122, preferably of elliptical shape with their major axes horizontal, which are adapted to be progressively uncovered when piston 110 is pushed up by fuel pressure in chamber 108. When ports 122 are opened by piston 110, a portion of the fuel entering chambers 106 and 108 escapes through return conduit 76 to the inlet side of pump 66, thereby reducing the fuel pressure ($p_2$) in chamber 106. Chamber 108 above valve 110 is connected to a chamber 124 by a passageway 126 in which is located a filter 128, so that piston 110 is balanced by the difference betwen the fuel pressure ($p_2$) in chamber 106 and ($p_3$) in chamber 124 and the force of spring 114.

Extending into chamber 124 is a projection 130 in the center of which is provided a double seat 132 for a main fuel flow regulating valve 134 of which the upper and lower faces are of equal area so that the force of fuel pressure ($p_3$) in chamber 124 on valve 134 is balanced. The upper end of stem 136 of valve 134 is connected by a toggle link 138 to a rocker arm 140 which is fixed on the left end of a horizontal spindle 142 journalled in a sleeve 144 which is mounted in the upper part of casing 100. Sleeve 144 is fixed against rotation and translation by a screw 146 threaded through the top of casing 100. Rocker arm 140 is adjustably mounted on spindle 142 by means of a split collar 148 which is tightened by a tap screw 150 (see Fig. 3). Between the end of sleeve 144 and collar 148 is a ball bearing 150 to receive the end thrust against collar 148 of the liquid pressure ($p_3$) in chamber 124. Sleeve 144 has a plurality of outer circumferential grooves 152 for the reception of packing rings to prevent the escape of fuel from chamber 124 between the adjacent surfaces of sleeve 144 and casing 100. Between outer and inner packing rings 152, sleeve 144 has a pair of outer circumferential grooves 154 which connect with the central bore in sleeve 144 through a plurality of radial ports 156. Registering with each groove 154 in sleeve 144 is a similar groove 158 in spindle 142. Left-hand groove 154 is connected by a passage-way 160, ports 122, and chamber 108, with conduit 76, and right-hand groove 154 communicates with the outside of casing 100 through a passage-way 164. By virtue of the foregoing construction, any liquid fuel which escapes from chamber 124, by working between the contacting surfaces of sleeve 144 and spindle 142, is returned to the inlet side of pump 66 through left-hand ports 156, groove 154, passage-way 160, ports 122, chamber 108 and conduit 76. Similarly, any compressed air which escapes from chamber 104, by working between contacting surfaces of sleeve 144 and spindle 142, escapes to the outside atmosphere through right-hand ports 156, groove 154 and passage-way 164. As fuel in chamber 124 is under a relatively high pressure ($p_3$), as compared to the air pressure ($p_5$) in chamber 104, packing rings 152 between passage-ways 160 and 164 prevent any liquid fuel from escaping through passage-way 164 or into chamber 104. Any liquid fuel which reaches left-hand groove 154 is immediately reduced from high pressure ($p_3$) to low pressure ($p_1$) by communicating passage-way 160, ports 122, chamber 108 and conduit 76, so that the liquid pressure on inner packing rings 154 is only that of low pressure ($p_1$).

On the right-hand end of spindle 142 are mounted a ball bearing 166, a collar 168, a rocker arm 170 and a toggle link 172, similar in all respects with ball bearing 150, collar 148, arm 140 and link 138, respectively. Link 172 connects collar 168 with a stem 174 integral with a disc 176 which forms the top member of bellows 102. A spring 178 biases disc 176 upwardly against the pressure differential ($p_5-p_6$) and the compression in spring 178 is adjusted by a threaded stem 180 mounted in casing 100 and locked in adjusted position by lock nut 182. A slot 184 in the lower end of stem 180 facilitates the rotation of stem 180 when lock nut 182 is loosened.

From the above described construction, it is apparent that main fuel flow regulating valve 134 is positioned with reference to its seat 132 by the action of bellows 102, working against spring 178, in response to the pressure differential ($p_5-p_6$), which is equal to the compressor discharge pressure minus the air inlet pressure ($p_a-p_1$). Also, the pressure ($p_2$) in chamber 106 is regulated by the metering head valve 110 which is balanced to maintain a relatively low, constant pressure differential between pressure ($p_3$) in chamber 124 and pressure ($p_2$) in chamber 106, regardless of the actual values of ($p_2$) and ($p_3$), by making the area of piston 110 equal to the area of valve seat 132, and adjusting the loading on piston 110 by spring 114 to a value equal to the desired constant pressure differential ($p_3-p_1$).

Fuel is discharged from chamber 124 through passageways 186 and 188, past check valve 190, and conduits 92 and 94 to afterburner nozzles 30. Check valve 190 is biased towards its seat by a spring 192 whose compression is adjusted by screw plug 194 threaded in the base of casing 100 and locked in adjusted position by lock nut 196. A slot 198 in the lower end of plug 194 facilitates its adjustment by means of a screw-driver when lock nut 196 is loosened. Valve 190 has a stem 200 which reciprocates in a bore 202 in casing 100 and serves to center valve 190 on its seat. The compression in spring 192 is adjusted to cause a small, constant pressure drop in the fuel flowing past the valve, so that there is always a constant pressure difference between pressures ($p_3$) and ($p_4$). The pressure ($p_4$) is determined by the construction of nozzles 30 and the back pressure in the tail pipe 34 (Fig. 1). The purpose of check valve 190 is to prevent the escape of fuel from chamber 124 when the afterburner fuel system is not in operation and thus insure that pressure ($p_3$) in chamber 124 will always be greater than pressure ($p_1$).

A portion of the fuel passing through chamber 124 is discharged through a passage-way 204, conduit 80, thermal control valve 78 and conduits 82 and 68 to the inlet side of pump 66, depending upon the degree of opening of valve 78. Valve 78 is of the rotary, flexible strap type comprising a cylindrical casing 206 in the center of which is journalled a shaft 208 which is turned by an electric motor 84 in proportion to variations in temperature of the exhaust gases in tail pipe 34. Fixedly mounted on shaft 208 is a flexible strap valve 210 which resiliently contacts the inner surface of casing 206 with a fluid-tight fit and is adapted to vary the opening of a discharge port 212 in proportion to the degree of rotation of shaft 208 by motor 84. The degree of rotation of motor 84 is responsive and proportional to changes in the temperature of the exhaust gases in tail pipe 34 by virtue of the action of thermocouple 92 which generates an electric current varying with the temperature of the exhaust gases. This current is amplified by amplifier 88 connected to a battery 190 or other source of electric current, and also connected by wires 86 to motor 84.

Upon a rise in temperature in tail pipe 34, electric motor 84 rotates shaft 208 in a counterclockwise direction which causes valve 210 to increase the opening of port 212 and hence the flow of fuel through valve 78. The greater the fuel flow through valve 78, the less will be the fuel flow through conduits 92 and 94 to afterburner nozzles 30. A reduction in fuel flow to nozzles 30 correspondingly reduces the combustion in supplementary combustion chamber 30 and the amount of reheating of the exhaust gases from turbine 26 which in turn lowers the temperature in tail pipe 34. Conversely, a fall in temperature in tail pipe 34 produces the opposite effects, and therefore the amount of fuel supplied to reheat the exhaust gases is automatically regulated in accordance with the temperature in tail pipe 34. Thermocouple 92 may be calibrated to function only near the upper limit of temperature that is permissible in the tail pipe because of metallurgical limitations, but if desired, the operating range of valve 78 can be increased to any selected extent by correspondingly extending the calibrated range of thermocouple 92.

We have found that the fuel flow to the afterburner nozzles can be much more closely controlled by having the thermal responsive valve 78 regulate a part of the fuel flow rather than regulate the total fuel flow to the afterburner nozzles. Since the diversion flow is only a small percentage (e. g. from 0 to 20 per cent) of the total flow, any given movement of valve 210 exerts only a correspondingly smaller effect upon the total fuel flow, so that any error in the regulating action of valve 78 is thus reduced proportionally.

Another advantage of our invention resides in the novel arrangement whereby the bellows 102 actuates the main fuel flow regulating valve 134 by means of rocker arms 170 and 140 and spindle 142. This obviates the use of a sliding piston with its increased frictional resistance and liability to stick with even minute traces of dirt in the fuel. The small rotary movement of spindle 142 with ball thrust bearings has a substantially negligible frictional resistance and affords an effective means of sealing the bellows chamber against entrance of fuel even when high fuel pressures are employed.

The small filter 128 held in place by plug 109 protects valve chamber 108 against the entrance of any dirt from the fuel. Since valve 110 is balanced to maintain a constant metering head in chamber 106, irrespective of the values of pressures $p_2$ and $p_3$, the rate of fuel flow through the afterburner fuel control apparatus varies directly with the opening of valve 134 which is determined by the pressure differential $(p_5-p_6)=(p_a-p_i)$. Also, since the pressure differential $(p_a-p_i)$ is a measure of the air flow through the engine, the flow of fuel to the afterburner nozzles 30 is always in proportion to the air flow through the engine which is essential for optimum operating results. At the same time, the pressure differential $(p_a-p_i)$ also varies directly in accordance with engine speed and flight speed and inversely with altitude of flight and/or atmospheric temperature, so that our improved control apparatus regulates the flow of reheated fuel in accordance with these variables which is also necessary for the best engine performance.

While we have shown and described the preferred embodiment of our invention, it should be understood that we do not limit ourselves to the precise details of construction disclosed by way of illustration, as these may be changed and modified by those skilled in the art without departing from the spirit of our invention or exceeding the scope of the appended claims.

We claim:

1. In combination with an aircraft turbojet engine having an air compressor, a main combustion chamber, a gas turbine, a reheat combustion chamber, separate from said main combustion chamber, for reheating the exhaust gases from said turbine, a fuel pump for supplying fuel to said reheat chamber, and a tail pipe for discharging said gases as a propulsive jet to the atmosphere; a fuel control apparatus comprising means for controlling the delivery of fuel from said pump to said reheat chamber in accordance with the pressure rise across said compressor, and means for automatically controlling the delivery of fuel to said chamber in accordance with the temperature of the exhaust gases in said tail pipe.

2. In combination with an aircraft turbojet engine having an air compressor, a main combustion chamber, a gas turbine, a reheat combustion chamber, separate from said main combustion chamber, for reheating the exhaust gases from said turbine, a fuel pump for supplying fuel to said reheat chamber and a tail pipe for discharging said gases as a propulsive jet to the atmosphere; a fuel control apparatus comprising means for controlling the delivery of fuel from said pump to said reheat chamber in accordance with the pressure rise across said compressor, said means including a fuel flow regulating valve and means for maintaining a relatively low, constant metering head on said valve, regardless of the pressure of the fuel supplied by said pump.

3. In combination with an aircraft turbo-jet engine having an air compressor, a gas turbine, a combustion chamber for reheating the exhaust gases from said turbine, a fuel pump for supplying fuel to said chamber, and a tail pipe for discharging said gases as a propulsive jet to the atmosphere; a fuel control apparatus comprising means for controlling the delivery of fuel from said pump to said chamber, including a fuel flow regulating valve, means for maintaining a relatively low, constant metering head on said valve, regardless of the pressure of the fuel supplied by said pump, and means for varying the opening of said valve in proportion to the density of the air entering said engine and the air flow therethrough.

4. In combination with an aircraft turbo-jet engine having an air compressor, a gas turbine, a combustion chamber for reheating the exhaust gases from said turbine, a fuel pump for supplying fuel to said chamber, and a tail pipe for discharging said gases as a propulsive jet to the atmosphere; a fuel control apparatus comprising means for controlling the delivery of fuel from said pump to said chamber, including a fuel flow regulating valve, means for maintaining a relatively low, constant metering head on said valve, regardless of the pressure of the fuel supplied by said pump, and means for varying the opening of said valve in accordance with the pressure differential across said compressor.

5. In combination with an aircraft turbo-jet engine having an air compressor, a gas turbine, a combustion chamber for reheating the exhaust gases from said turbine, a fuel pump for supplying fuel to said chamber, and a tail pipe for discharging said gases as a propulsive jet to the atmosphere; a fuel control apparatus comprising means for controlling the delivery of fuel from said pump to said chamber, including a fuel flow regulating valve, means for maintaining a relatively low, constant metering head on said valve, regardless of the pressure of the fuel supplied by said pump, including bellows means for varying the opening of said valve in accordance with the pressure differential across said compressor and an adjustable spring for loading said bellows means.

6. In combination with an aircraft turbo-jet engine having an air compressor, a gas turbine, a combustion chamber for reheating the exhaust gases from said turbine, a fuel pump for supplying fuel to said chamber, and a tail pipe for discharging said gases as a propulsive jet to the atmosphere; a fuel control apparatus comprising means for controlling the delivery of fuel from said pump to said chamber, including a fuel flow regulating valve, means for maintaining a relatively low, constant metering head on said valve, regardless of the pressure of the fuel supplied by said pump, including a metering head regulating valve balanced with said fuel flow regulating valve, so as to maintain a relatively low, constant pressure on the latter, regardless of the value of the upstream fuel pressure on said valves, including an adjustable spring loading means for said metering head regulating valve.

7. In combination with an aircraft turbo-jet engine having an air compressor, a gas turbine, a combustion chamber for reheating the exhaust gases from said turbine, a fuel pump for supplying fuel to said chamber, and a tail pipe for discharging said gases as a propulsive jet to the atmosphere; a fuel control apparatus comprising means for controlling the delivery of fuel from said pump to said chamber, including a fuel flow regulating valve, means for maintaining a relatively low, constant metering head on said valve, regardless of the pressure of the fuel supplied by said pump, including a metering head regulating valve balanced with said fuel flow regulating valve, so as to maintain a relatively low, constant pressure on the latter, regardless of the value of the upstream fuel pressure on said valves, including means for varying the lift of said fuel flow regulating valve in accordance with the pressure differential across said compressor.

8. In combination with an aircraft turbojet engine having an air compressor, a main combustion chamber, a gas turbine, a separate, reheat combustion chamber for reheating the exhaust gases from said turbine, a fuel pump for supplying fuel to said reheat chamber, and a tail pipe for discharging said gases as a propulsive jet to the atmosphere; a fuel control apparatus comprising means for controlling the delivery of fuel from said pump to said reheat chamber, including a fuel flow regulating valve; means for maintaining a relatively low, constant metering head on said valve, regardless of the pressure of the fuel supplied by said pump, including a metering head regulating valve hydraulically balanced with said fuel flow regulating valve, so as to maintain a relatively low, constant pressure on the latter, regardless of the value of the upstream fuel pressure on said valves; means for varying the lift of said fuel flow regulating valve in accordance with the pressure differential across said compressor, and means for transmitting the movements of said lift-varying means to said valve, comprising a rotatable spindle connected by a rocker arm and link to said lift-varying means and to said valve respectively.

9. In combination with an aircraft turbojet engine having an air compressor, a gas turbine, a combustion chamber for reheating the exhaust gases from said turbine, a fuel pump for supplying fuel to said chamber, and a tail pipe for discharging said gases as a propulsive jet directly to the atmosphere; a fuel control apparatus comprising means for automatically varying the delivery of fuel from said pump to said chamber in inverse proportion to the temperature of the exhaust gases in said tail pipe, and means for shunting a variable portion of the fuel flow from said pump around said pump, in accordance with said temperature.

10. A fuel control device as in claim 9, including a flexible strap valve in said shunting means.

11. A fuel control device as in claim 9, including an electrically operated valve in said shunting means.

12. In combination with an aircraft turbojet engine having an air compressor, a gas turbine, a combustion chamber for reheating the exhaust gases from said turbine, a fuel pump for supplying fuel to said chamber, and a tail pipe for discharging said gases as a propulsive jet directly to the atmosphere; a fuel control apparatus comprising means for automatically varying the delivery of fuel from said pump to said chamber in inverse proportion to the temperature of the exhaust gases in said tail pipe, and means for shunting around said pump a minor fraction of its fuel discharge, which fraction varies in direct proportion with said temperature, whereby any error in the functioning of said shunting means causes a smaller error in functioning of said control apparatus proportional to the magnitude of said fraction.

13. In combination with an aircraft turbojet engine having an air compressor, a gas turbine, a combustion chamber for reheating the exhaust gases from said turbine, a fuel pump for supplying fuel to said chamber, and a tail pipe for discharging said gases as a propulsive jet directly to the atmosphere; a fuel control apparatus comprising means for automatically varying the delivery of fuel from said pump to said chamber in inverse proportion to the temperature of the exhaust gases in said tail pipe, and means, responsive to said temperature, for returning a variable fraction of the fuel flow from said pump to the inlet side thereof, whereby the balance of the fuel flow from said pump is delivered to said chamber in inverse proportion to said temperature.

14. A fuel control apparatus associated with a fuel pump, comprising a relatively high pressure fuel chamber connected to said pump and having a hydraulically balanced fuel flow regulating valve therein, a relatively low pressure, compressed air chamber having therein a device for actuating said valve, and a bore communicating with said fuel chamber, means in said bore connecting said device to said valve, and means for preventing the escape of fuel from said fuel chamber to said air chamber through said connecting bore.

15. A fuel control apparatus as in claim 14, including means for reducing the escape of air from said air chamber and means for venting said escaped air to the outside of said apparatus.

16. A fuel control apparatus as in claim 14, including a fuel return conduit connecting said apparatus with the inlet side of said pump, and means for returning to said conduit any fuel which escapes from said high pressure fuel chamber through said connecting means.

17. A fuel control apparatus as in claim 14, wherein said fuel flow regulating valve is of the poppet type and said valve actuating device is a pressure differential responsive bellows.

18. A fuel control apparatus as in claim 14, wherein said connecting means comprises a spindle journalled in a wall separating said chambers and connected by a rocker arm and link to said valve and said actuating device, respectively.

19. A fuel control device as in claim 18, wherein said spindle is provided at each end with a ball thrust bearing.

20. A fuel control apparatus comprising a first fuel chamber having a fuel flow regulating valve therein, a second fuel chamber upstream from said valve and having therein a pressure regulating valve subject directly to the pressure in said second chamber acting on said valve in one direction, said pressure regulating valve being also directly subject to the pressure in said first chamber, acting on said valve in the opposite direction; said pressure regulating valve being further adapted to maintain a relatively low, constant pressure differential between said chambers, regardless of the values of the fuel pressures therein; said pressure regulating valve comprising a piston subjected on one end to the pressure in said first chamber and the force of an adjustably loaded spring, and on its opposite end to the pressure in said second chamber, the areas of said fuel flow regulating valve and said piston being equal; whereby said pressure regulating valve maintains a constant pressure differential between said chambers equal to the adjusted load of said spring and independent of the values of the pressures in said chambers.

21. A fuel control apparatus associated with a fuel pump, comprising a fuel chamber connected to said pump when said apparatus is in operation and having a fuel flow regulating valve therein, a fuel delivery outlet from said chamber having an outwardly opening, constant drop, check valve therein, and means for maintaining said regulating valve in closed position when said apparatus is not in operation, whereby the fuel in said chamber is prevented from escaping therefrom when said apparatus is not in operation and the fuel in said chamber is always maintained under a pressure higher than the pressure in the inlet side of said pump.

22. For an internal combustion engine having: an air compressor, a main combustion chamber, a main fuel pump for supplying fuel to said chamber, a gas turbine, a supplementary combustion chamber for reheating the exhaust gases from said turbine, a supplementary fuel pump for supplying fuel to said supplementary combustion chamber and a tail pipe for discharging said exhaust gases to the atmosphere; the combination of a main fuel control apparatus comprising means, responsive to the pressure differential across said compressor, for controlling the delivery of fuel from said main pump to said main combustion chamber in accordance with the mass air flow through said engine, and a supplementary fuel control apparatus comprising means, subject to said pressure differential, for controlling the delivery of fuel from said supplementary pump to said supplementary combustion chamber in accordance with the mass air flow through said engine and the temperature of said exhaust gases in said tail pipe.

References Cited in the file of this patent

UNITED STATES PATENTS

| | | |
|---|---|---|
| 2,095,991 | Lysholm | Oct. 19, 1937 |
| 2,224,472 | Chandler | Dec. 10, 1940 |

(Other references on following page)

UNITED STATES PATENTS

| | | |
|---|---|---|
| 2,227,666 | Noack | Jan. 7, 1941 |
| 2,290,921 | Udale | July 28, 1942 |
| 2,336,232 | Doran | Dec. 7, 1943 |
| 2,405,888 | Holley | Aug. 13, 1946 |
| 2,422,808 | Stokes | June 24, 1947 |
| 2,456,603 | Barfod | Dec. 14, 1948 |
| 2,457,595 | Orr | Dec. 28, 1948 |
| 2,470,382 | Vanni | May 17, 1949 |
| 2,498,939 | Bobier | Feb. 28, 1950 |
| 2,531,780 | Mock | Nov. 28, 1950 |
| 2,566,373 | Redding | Sept. 4, 1951 |
| 2,570,591 | Price | Oct. 9, 1951 |

FOREIGN PATENTS

| | | |
|---|---|---|
| 592,769 | Great Britain | Sept. 29, 1947 |